(12) United States Patent
Nikolov et al.

(10) Patent No.: US 9,738,159 B2
(45) Date of Patent: Aug. 22, 2017

(54) BLOWER SYSTEM AND METHOD

(71) Applicant: GENERAL ELECTRIC COMPANY, Schenectady, NY (US)

(72) Inventors: Emil Nikolov, Erie, PA (US); Ajith Kuttainnair Kumar, Erie, PA (US); Theodore Clark Brown, Erie, PA (US); Bret Dwayne Worden, Erie, PA (US); Sudhir Kumar Gupta, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/156,779

(22) Filed: May 17, 2016

(65) Prior Publication Data

US 2016/0257201 A1    Sep. 8, 2016

Related U.S. Application Data

(60) Division of application No. 14/526,210, filed on Oct. 28, 2014, now Pat. No. 9,391,543, which is a continuation-in-part of application No. 13/450,256, filed on Apr. 18, 2012, now Pat. No. 8,890,464, (Continued)

(51) Int. Cl.
*H02P 27/04* (2016.01)
*B60L 1/00* (2006.01)
*H02P 3/12* (2006.01)
*B61C 5/02* (2006.01)
*B60L 7/02* (2006.01)
*B60L 7/10* (2006.01)
*H02P 6/06* (2006.01)

(52) U.S. Cl.
CPC ............... *B60L 1/003* (2013.01); *B60L 7/02* (2013.01); *B60L 7/10* (2013.01); *B61C 5/02* (2013.01); *H02P 3/12* (2013.01); *H02P 6/06* (2013.01); *B60L 2200/26* (2013.01); *Y02T 10/642* (2013.01); *Y02T 30/10* (2013.01)

(58) Field of Classification Search
CPC ............... B60L 1/003; B60L 7/02; B60L 7/10
USPC .......................................................... 318/800
See application file for complete search history.

(56) References Cited

U.S. PATENT DOCUMENTS

2005/0276020 A1* 12/2005 Ahmad ............... B60L 1/003
361/698
2008/0157540 A1* 7/2008 Fattal ............... B60L 11/123
290/40 R (Continued)

*Primary Examiner* — Erick Glass
(74) *Attorney, Agent, or Firm* — Global Patent Operation; John A. Kramer

(57) ABSTRACT

A system includes a grid coupled to an electrical bus; an electrical power modulation device coupled to the electrical bus that can output modified electrical power received from the electrical bus; a blower motor coupled to the electrical power modulation device that can receive the modified electrical power output and can provide a stream of air to affect a temperature of the grid, and a controller. A speed of the blower motor may be based at least in part on an amount of the modified electrical power. The controller can receive an operating parameter, and is responsive to that parameter by causing the electrical power modulation device to vary the amount of the modified electrical power. A blower motor speed may be controlled based at least in part on the operating parameter.

15 Claims, 6 Drawing Sheets

Related U.S. Application Data which is a division of application No. 12/132,479, filed on Jun. 3, 2008, now Pat. No. 8,179,084.

(56) References Cited

U.S. PATENT DOCUMENTS

| | | | | |
|---|---|---|---|---|
| 2009/0288577 | A1* | 11/2009 | Kumar | B60L 11/02 105/36 |
| 2011/0304199 | A1* | 12/2011 | Rozman | B60L 1/00 307/9.1 |
| 2016/0194009 | A1* | 7/2016 | Jalla | B61C 3/00 105/61 |

* cited by examiner

BLOWER SYSTEM AND METHOD

CROSS-REFERENCE TO RELATED APPLICATIONS

This application is divisional of U.S. patent application Ser. No. 14/526,210, filed 28 Oct. 2014, which is a continuation-in-part of U.S. patent application Ser. No. 13/450,256, filed 18 Apr. 2012, now U.S. Pat. No. 8,890,464 issued 18 Nov. 2014, which is a divisional application of U.S. patent application Ser. No. 12/132,479, filed 3 Jun. 2008, now U.S. Pat. No. 8,179,084, issued 15 May 2012, and the entire disclosures of all of which are incorporated herein by reference.

FIELD

Embodiments of the subject matter disclosed herein relate to blower systems and related methods of operation.

BACKGROUND

A propulsion system may include one or more motors. For example, a propulsion system having one or more traction motors may be utilized in a mining application, locomotive application, marine application, automotive application, or drilling application. In one example, a vehicle having traction motors may perform dynamic braking to slow the vehicle. During dynamic braking operations, traction motors may generate electrical power that may be transmitted to a grid (such as an energy storage device), which heats in response to the supplied electrical power due in part to the electrical resistance of certain of its elements. To cool the grid, a blower may provide forced-air. When not in use, the blower may be cold enough to accumulate ice or debris that may impair its performance or start up. Merely running the blower all the time to avoid freezing wastes energy, is noisy, and wears out parts. Various other issues may arise with the above described configuration.

BRIEF DESCRIPTION

In one aspect, a system includes a grid coupled to an electrical bus; an electrical power modulation device coupled to the electrical bus that can output modified electrical power received from the electrical bus; a blower motor coupled to the electrical power modulation device that can receive the modified electrical power output and can provide a stream of air to affect a temperature of the grid, and a controller. A speed of the blower motor may be based at least in part on an amount of the modified electrical power. The controller can receive an operating parameter, and is responsive to that parameter by causing the electrical power modulation device to vary the amount of the modified electrical power. A blower motor speed may be controlled based at least in part on the operating parameter.

A method of controlling is provided that includes generating an amount of electrical power across an electrical bus. At least some of the amount of electrical power is modulated. And, the modulated electrical power is supplied to a motor of a blower to control at least one of a speed and a direction of the motor based at least in part on an operating condition.

BRIEF DESCRIPTION OF THE DRAWINGS

The invention may be understood from reading the following description of non-limiting embodiments, with reference to the attached drawings, wherein below.

DETAILED DESCRIPTION

Figure 1:
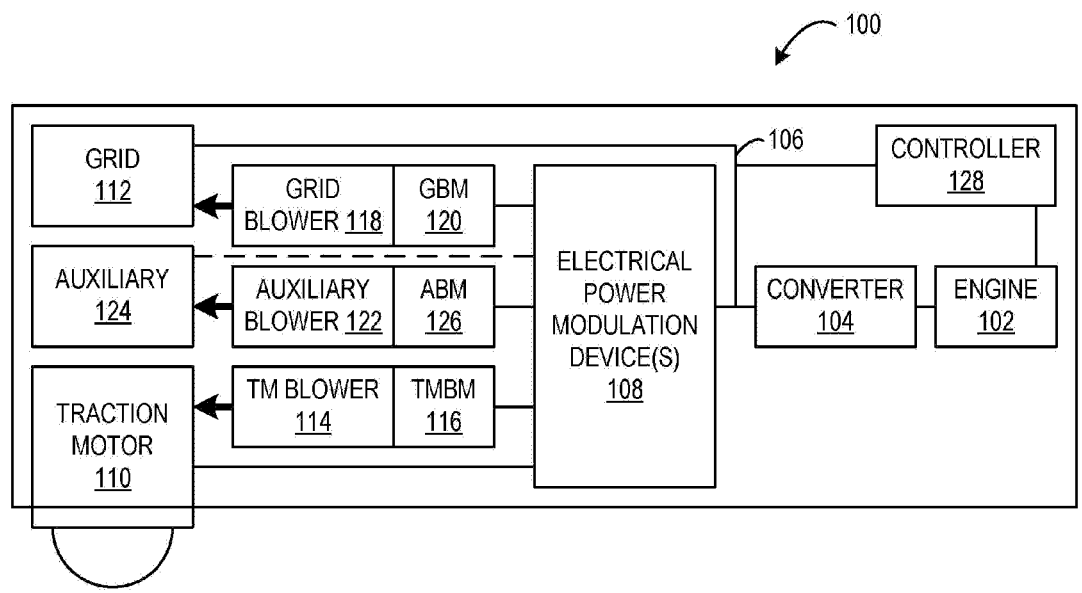
FIG. 1 shows a schematic diagram of a vehicle system.

The subject matter disclosed herein may relate to blowers useful in cooling grids. Embodiments may relate to mechanisms that dissipate heat. Suitable electrical power dissipation devices may be disposed in a vehicle system, such as an electric or hybrid electric automobile, or a diesel-electric locomotive.

As used herein, resistive elements, grids, and energy storage devices (collectively referred to as a "grid") means any device capable of dissipating, storing or disposing of electrical energy generated by a motor in a dynamic braking mode of operation. And, in the process of so doing the temperature of the device may increase. The term cycle skipping refers to technique where one or more thyristors couple the source of alternating current to a motor and may be switched at proper points in time to generate a fundamental frequency component of the alternating supply current.

In one embodiment, a controller may trigger a thyristor for a phase line of the alternating current supply during several consecutive positive half-cycles of the AC voltage for that supply line, and then it is not triggered for one or more cycles of the supply voltage. Next, the thyristor may be triggered during several consecutive negative half-cycles of the supply line voltage. This pattern may be repeated with a pause of one or more cycles between each pattern. Thyristors for the other two phase lines in a three-phase circuit may be fired in the same pattern, but 120 degrees out of phase. The pattern may apply current to the motor having an effective frequency which is a fraction of the AC supply frequency. The motor synchronizes to this lower frequency and runs at a slower speed. Cycle skipping may be substituted with a relatively elaborate AC frequency conversion apparatus. As such, in some embodiments, frequency conversion apparatus may be employed.

According to an embodiment, a system may include a grid, an electrical bus, an electrical power modulation device, a blower motor, and a controller. The grid couples to the electrical bus. The electrical power modulation device couples to the electrical bus that can output modified electrical power received from the electrical bus. The blower motor couples to the electrical power modulation device that can receive the modified electrical power output and can provide a stream of air to affect a temperature of the grid. A speed of the blower motor may be based at least in part on an amount of the modified electrical power. The controller can receive an operating parameter, and is responsive to that parameter by causing the electrical power modulation device to vary the amount of the modified electrical power. A blower motor speed may be controlled based at least in part on the operating parameter.

During operation, an amount of electrical power is supplied across an electrical bus. At least some of the amount of electrical power is modulated. And, the modulated electrical power may be supplied to a motor of a blower to control at least one of a speed and a direction of the motor based at least in part on an operating condition. Sensors or the like may determine ambient conditions as the operating condition. A suitable operating condition may include an ambient temperature, an ambient humidity level, or both. These operating conditions may come from direct sensor readings, or may be estimated or implied—winter time in a cold region may indicate a likelihood of freezing, for example, even without a temperature sensor.

The ambient temperature and/or the ambient humidity level may be sufficient to allow or facilitate formation of ice on or proximate to the blower, the motor, or both the blower and the motor, should the motor be cold and/or not be in operation. If so, then the controller may supply to the blower a sufficient amount of modulated electrical power to increase a temperature of the motor and/or move the blower's fan to reduce or prevent the formation of ice. The controller may operate the motor to avoid icing even when a temperature of the grid is about the same as an ambient temperature. That is, the blower would not normally run, and thereby wear out the useful life, when it isn't needed to cool the grid.

Running the motor to heat the motor but not to cool the grid may be accomplished at a speed that is less than a full speed of the motor. In one embodiment, operating the blower to avoid icing may include running the motor at a speed that is in a range of from about 1 percent to about 10 percent of the full operating speed of the motor. Other speeds may be selected based on the type of motor, the ambient operating conditions, and the level of desire to extend the equipment's useful life. The motor may be supplied with sufficient current to provide a relatively constant temperature of up to about 15 degrees Celsius warmer than the motor would be without any supplied current (i.e., ambient temperature).

FIG. 1 schematically shows an example of a vehicle system 100. The vehicle system includes an engine 102 that may generate torque output that drives a converter 104. The converter may produce electrical power that may be provided to various electrical components by an electrical bus 106. In some embodiments, the converter may include one or more alternators that produce alternating current (AC) electrical power. In some embodiments, the converter may include one or more rectifiers that produce direct current (DC) electrical power. Further, in some embodiments, the converter may include both one or more alternators and one or more rectifiers. Correspondingly, in some embodiments, the electrical bus may be a DC electrical bus. Further, in some embodiments, the electrical bus may be an AC electrical bus.

One or more electrical power modulation device(s) 108 may receive electrical power from the electrical bus. The electrical power modulation device(s) may modify the electrical power received from the electrical bus to a suitable form to be provided to electrical components of the vehicle system. The electrical power modulation device may modify a parameter of the electrical power such as voltage or frequency, for example. In some embodiments, the electrical power modulation device may include an inverter. In one example, the inverter converts DC electrical power to AC electrical power, among other modifications. In some embodiments, the electrical power modulation device may include a converter. In one example, the converter modifies the voltage of DC electrical power from the DC electrical bus to a different voltage to supply the DC electrical power to a DC electrical component.

A motor, such as the illustrated traction motor 110, may receive electrical power from the electrical power modulation device(s) to provide tractive power to propel the vehicle. For the purpose of simplicity, only one motor is illustrated and it is a traction motor. A plurality of traction motors may provide tractive power to propel some vehicles using electrical power provided from the electrical bus. The motor may act as a generator to provide dynamic braking to slow the vehicle. During dynamic braking, the traction motor may provide torque in a direction that is opposite from the rolling direction of the vehicle which, in turn, generates electrical power that may be sent through the electrical bus to a grid 112. In one embodiment, the electrical power may flow across a plurality of resistive elements of the grid, and the grid may include one element, or stacks of resistive elements connected in series to the electrical bus. In another embodiment, the grid is an energy storage device that contains one or more of batteries, ultracaps, and the like, so that the electrical power is stored inside the grid. In either event, the grid temperature increases and the resulting heat may need to be dissipated.

In some embodiments, the electrical bus may include one or more switches (not shown) that may be adjusted to control the transmission of electrical power. During dynamic braking a state of a switch may be changed to send electrical power generated by the traction motor from one location to another. In one aspect, the power may be sent to the grid or to an auxiliary power system or to an aftertreatment regeneration device, and the like. Alternatively, the grid may include as components both a resistive element and an energy storage device so that the switch can send electrical power, selectively, to one, the other, or both grid components.

During operation of the vehicle, the temperature of the grid and the traction motor may increase. Accordingly, the grid and the traction motor may be force-air cooled. A traction motor blower 114 may blow air to cool the traction motor. The traction motor blower may be powered by a traction motor blower motor that is configured to receive electrical power from the electrical power modulation device(s) 108 which modifies electrical power received from the electrical bus. Likewise, a grid blower 118 may blow air to cool the grid 112. The grid blower 118 may be powered by a grid blower motor 120 that receives electrical power from the electrical power modulation device(s) which modifies electrical power received from the electrical bus. The vehicle system may include plural grid blowers to cool one or more grid(s).

Other components of the vehicle system may be force-air cooled. An auxiliary blower 122 may blow air to cool an auxiliary component 124. The auxiliary blower may be powered by an auxiliary blower motor 126 that is configured to receive electrical power from the electrical power modulation device(s) which modifies electrical power received from the electrical bus. In some embodiments, the auxiliary component may receive electrical power from the electrical bus. For example, the auxiliary component may include a compressor configured to compress intake air, such as a supercharger or a turbocharger. However, the auxiliary component need not receive electrical power. For example, the auxiliary component may include a radiator for cooling the diesel engine. The auxiliary blower may be used to cool intake air prior to entering a compression device to improve engine efficiency.

The vehicle system may include a plurality of different electrical power modulation devices, each of which may supply electrical power to a different component. Alternatively or optionally, the vehicle system may include one or more electrical power modulation device(s) connected to a switch that may be controlled to selectively provide electrical power to different components connected to the switch.

The vehicle may include a controller 128 to control certain components, such as, for example, the engine, traction motor, blower drives, and the like. The controller may include a microcomputer having a processor and electronic storage media for executing programs and storing calibration and control data. The controller may receive signals from sensors coupled to components of the vehicle system and may perform feedback and/or feedforward control based on the signals. Examples of signals that may be received by the controller include engine speed, motor speed, blower speed, engine temperature, motor temperature, grid temperature, ambient temperature, engine load, motor load, voltage, current, etc. Furthermore, the controller may vary blower speed based on various operating conditions by adjusting the state of electrical power modulation devices that provide electrical power to blower motors. In particular, an electrical power modulation device may include a plurality of switches, the state of which may be toggled to modulate electrical power. For example, an electrical power modulation device may be controlled to raise/lower voltage, increase/decrease frequency, adjust phase, etc.

Figure 2:
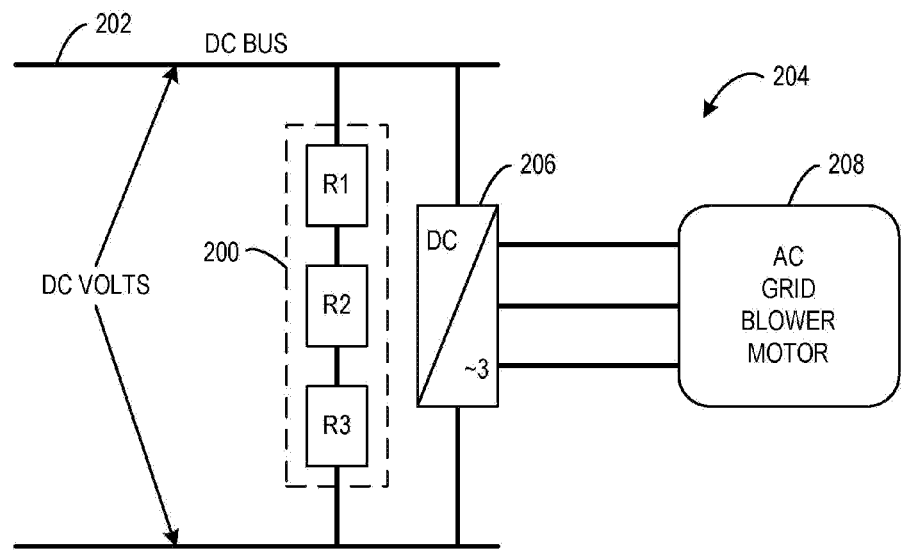
FIG. 2 shows a schematic diagram of one embodiment of a grid blower drive configuration.

FIG. 2 schematically shows one embodiment of a grid blower drive configuration of the present disclosure. In the illustrated embodiment, a grid 200 includes three resistive elements (R1, R2, R3) that are connected in series to a DC electrical bus 202. The grid may include a suitable number of resistive elements to dissipate electrical power in the form of heat.

During the dynamic braking mode of operation, electrical power may be generated as a result of the traction motor generating torque to slow the vehicle. The generated electrical power may be transferred from the traction motor through the DC bus to the resistive elements. Consequently, the temperature of the resistive elements of the grid may increase up to a temperature of approximately six hundred degrees Celsius or more, for example. A blower (not shown) may be operated to blow air at the grid to aid in dissipation of the heat. The blower may be powered by a grid blower drive 204 that includes an AC grid blower motor. The AC grid blower motor may be coupled to a power electronics package that may include an inverter 206, which itself may be coupled to taps on the DC bus. The inverter may provide variable frequency and/or variable voltage output to the AC grid blower motor 208. As an example, the inverter may be a DC to three phase inverter having three phase output. In the illustrated embodiment of the drive configuration, because the inverter is directly connected to the DC bus the grid blower motor may be powered by the entire voltage on the DC bus, if desired, to operate the grid blower at a high speed.

Because the AC grid blower motor receives electrical power from the inverter rather than directly from across the resistors, the operation of the grid blower motor and correspondingly the speed of the grid blower may be decoupled from the electrical power on the grid. The speed of the grid blower may be operated and adjusted independent of the amount of electrical power on the grid. By enabling independent speed control of the grid blower motor, the acceleration and/or speed of the grid blower may be varied regardless of a voltage level on the grid. Accordingly, the grid blower speed may be controlled to enhance cooling of the grid which may extend the usable lifetime of the grid as well as increase the braking capability.

Due at least in part to the variable speed control of the grid blower, under some conditions, the speed of the grid blower may be reduced or maintained at a substantially constant speed. For example, grid blower speed may be reduced so as to reduce inertial stress on the impeller or fan blades of the grid blower to extend the useful lifetime of the grid blower. As another example, the speed of the grid blower may be reduced in response to a sensed vibration level. In one embodiment, the response may be to reduce the audible noise level of the grid blower to a desired audible noise level. Grid blower control strategies for managing audible noise will be discussed in further detail below with reference to FIG. 7. Further, the speed of the grid blower may be maintained at a substantially constant speed even as electrical power on the grid or bus varies to reduce stress on the grid blower from centrifugal forces.

Figure 3:
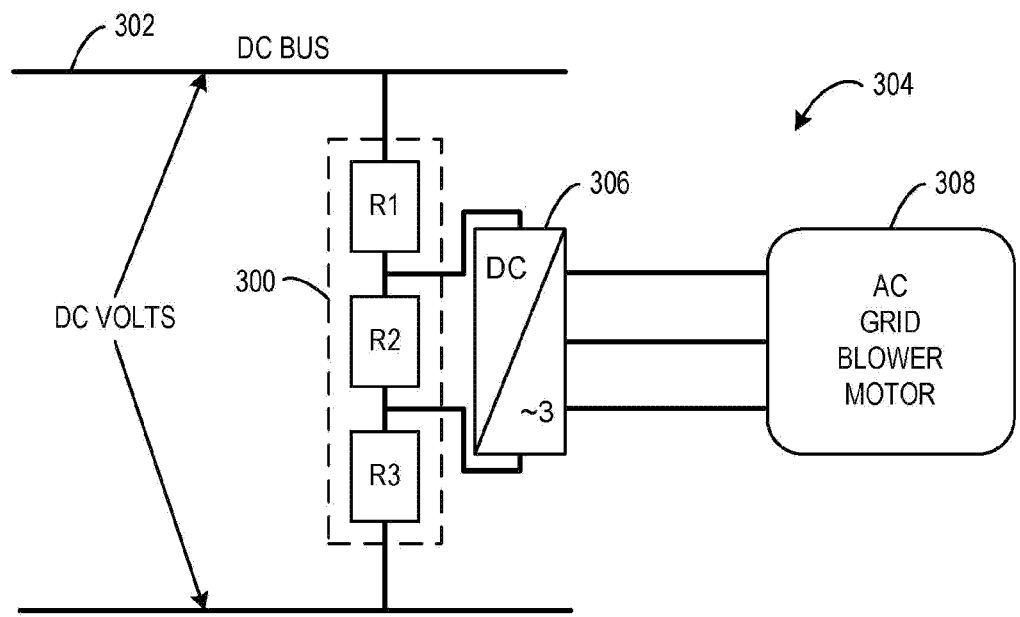
FIG. 3 shows a schematic diagram of another embodiment of a grid blower drive configuration.

FIG. 3 schematically shows another embodiment of a grid blower drive configuration of the present disclosure. In the illustrated embodiment, a grid 300 includes three resistive elements (R1, R2, R3) that are connected in series to a DC electrical bus 302. A grid blower (not shown) may be provided to generate forced-air cooling of the grid 300. The grid blower may be powered by a grid blower drive 304 that includes an inverter 306 that may be connected to taps across the grid 300. The inverter 306 may provide variable frequency and/or variable voltage AC output to an AC grid blower motor 308 that is coupled to an output of the inverter 306. As a particular example, the inverter may be a DC to three phase inverter having three phase AC output. In one embodiment of the drive configuration, because the inverter is connected to taps across the resistance of the grid, the amount of current provided to the inverter and/or the grid blower motor may increase. Further, because the current is increased, a different AC grid blower motor may be used for forced-air cooling of the grid. For example, a larger and/or more powerful AC grid blower motor, a lower voltage motor, or standard voltage (insulation type) motor may be employed.

In the illustrated embodiment, the inverter may be connected across one or some of the resistors of the grid depending on the power handling capabilities of the inverter and/or the grid blower motor. By using AC motors in the grid blower drives, drive maintenance may be reduced relative to using DC motors. In particular, DC motors have commutation brushes that require routine maintenance. Because AC motors lack commutation brushes reduced maintenance may be used. Moreover, because AC motors may lack commutation brushes the blowers can be run at higher speeds before being mechanically limited as compared to DC motors which may be mechanically limited by the commutation brushes.

Figure 4:
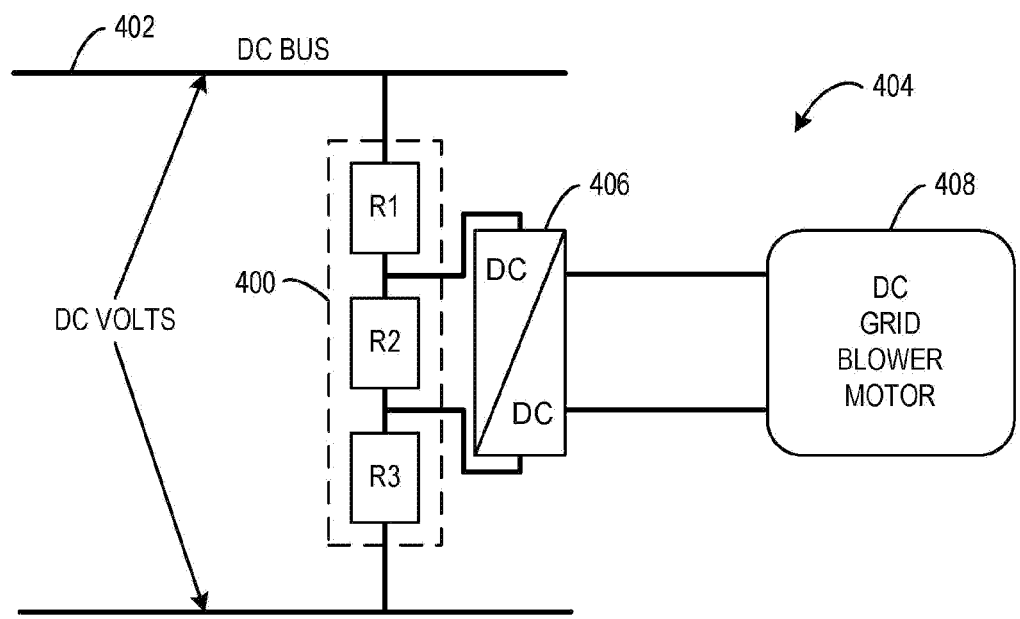
FIG. 4 shows a schematic diagram of yet another embodiment of a grid blower drive configuration.

FIG. 4 schematically shows yet another embodiment of a grid blower drive configuration of the disclosure. In the illustrated embodiment, a grid 400 includes three resistive elements (R1, R2, R3) that are connected in series to a DC electrical bus 402. A grid blower (not shown) may be provided to generate forced-air cooling of the grid 400. The grid blower may be powered by a grid blower drive 404 that includes a DC-to-DC converter 406 that may be connected to taps across the grid 400. The DC-to-DC converter 406 may provide variable voltage DC output to a DC grid blower motor 408 that is coupled to the output of the DC-to-DC converter 406. This example drive configuration may be implemented as a reduced cost alternative to the above described embodiments, because the converter and/or the DC grid blower motor may cost less than an inverter and/or an AC grid blower motor. Note that only two wires are used to connect the one motor in series, but a configuration having three wires may be used for non series machine like parallel machines, or separately excited motors. Further note, a tap change between various voltage levels (e.g. a high voltage tap and a low voltage tap) may be utilized to achieve at least some of the variable speed control functionality.

Figure 5:
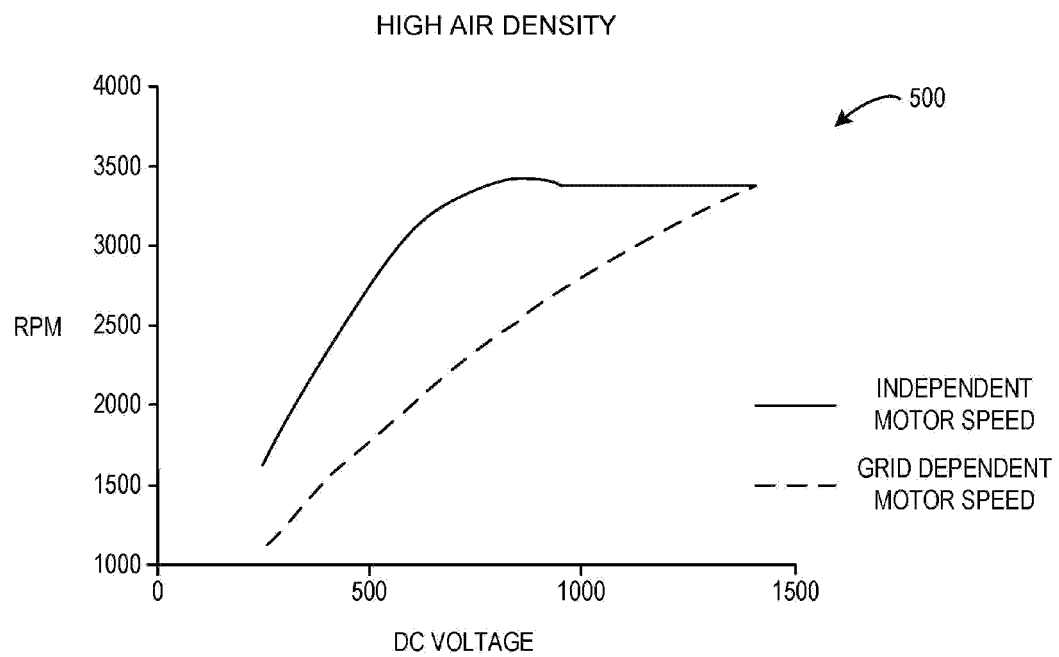
FIG. 5 shows a line graph comparing the performance of a grid blower connected to the grid blower drive configuration of FIG. 2 versus a grid blower directly connected across the resistive elements of a grid in a high air density environment.

FIG. 5 shows an example of a performance comparison of equal horsepower grid blower motors conducted in a high air density environment. The speed of a first motor is controlled independent of a grid voltage and the speed of a second motor is dependent on the grid voltage. For this example comparison, the first grid blower motor was connected according to the drive configuration shown in FIG. 2 and the second motor was directly connected to taps across the resistance elements of a grid. Accordingly, the operation of the first motor was independent of an amount of electrical power on the grid whereas the operation of the second motor was dependent on the amount of electrical power on the grid. Line graph 500 compares speed of the grid blower motors in revolutions per minute (RPM) along a Y-axis versus voltage in DC volts along an X-axis. The performance of the first grid blower motor is indicated by a solid line and the performance of the second grid blower motor is indicated by a dashed line.

The line graph 500 clearly shows that the first grid blower motor achieves a higher speed relative to the second grid blower motor when operating at the same voltage, thus indicating that the first motor may be controlled to accelerate faster than the second motor can accelerate based on the electrical power on the grid. The first motor operational acceleration advantage exists all the way until the operating speed performance limit of the grid blower motors is reached (at approximately 3400 RPM and 1400 VDC). Accordingly, due to the quicker acceleration, the first grid blower motor may achieve a maximum operating speed at a much lower voltage (approximately 800 VDC) as compared to that of the second grid blower motor (approximately 1400 VDC). Accordingly, the independently controlled grid blower may have enhanced forced-air cooling that may extend the operational lifetime of the grid.

Figure 6:
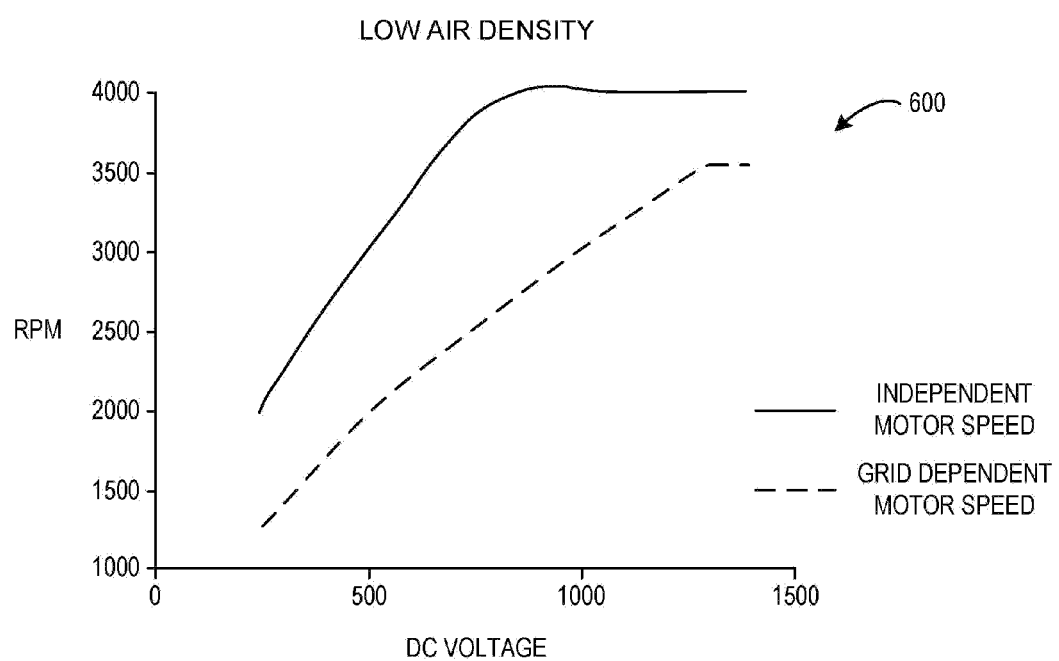
FIG. 6 shows a line graph comparing the performance of a grid blower connected to the grid blower drive configuration of FIG. 2 versus a grid blower directly connected across the resistive elements of a grid in a low air density environment.

Moreover, the operational advantages of the first grid blower motor as compared to the second grid blower motor may be more pronounced in a low air density environment. FIG. 6 shows an example performance comparison of the equal horsepower grid blower motors of FIG. 5 conducted in a low air density environment in a line graph 600. Similar to the high air density example, the first grid blower motor achieves a higher speed relative to the second grid blower motor when operating at the same voltage, due to due to decoupled ratio of motor voltage and grid resistance voltage and also due to frequency control of the inverter of the first grid blower motor. However, due to the low air density, the first grid blower motor is capable of achieving a higher maximum speed than the second grid blower motor. In a particular case where the second grid blower motor is a DC motor, the speed capability of second grid blower motor may be mechanically restricted by the commutation brushes of the DC grid blower motor whereas the first motor may be an AC grid blower motor that operates without commutation brushes and has a higher mechanical threshold. Accordingly, the AC grid blower motor may maintain an operational advantage over the DC grid blower across a greater operational range in a low air density environment.

The comparisons illustrated in FIGS. 5 and 6 are examples. Further, note that a comparison of a DC motor connected according to the above described drive configuration may have an operational advantage over a DC motor that is directly connected to the grid.

Figure 7:
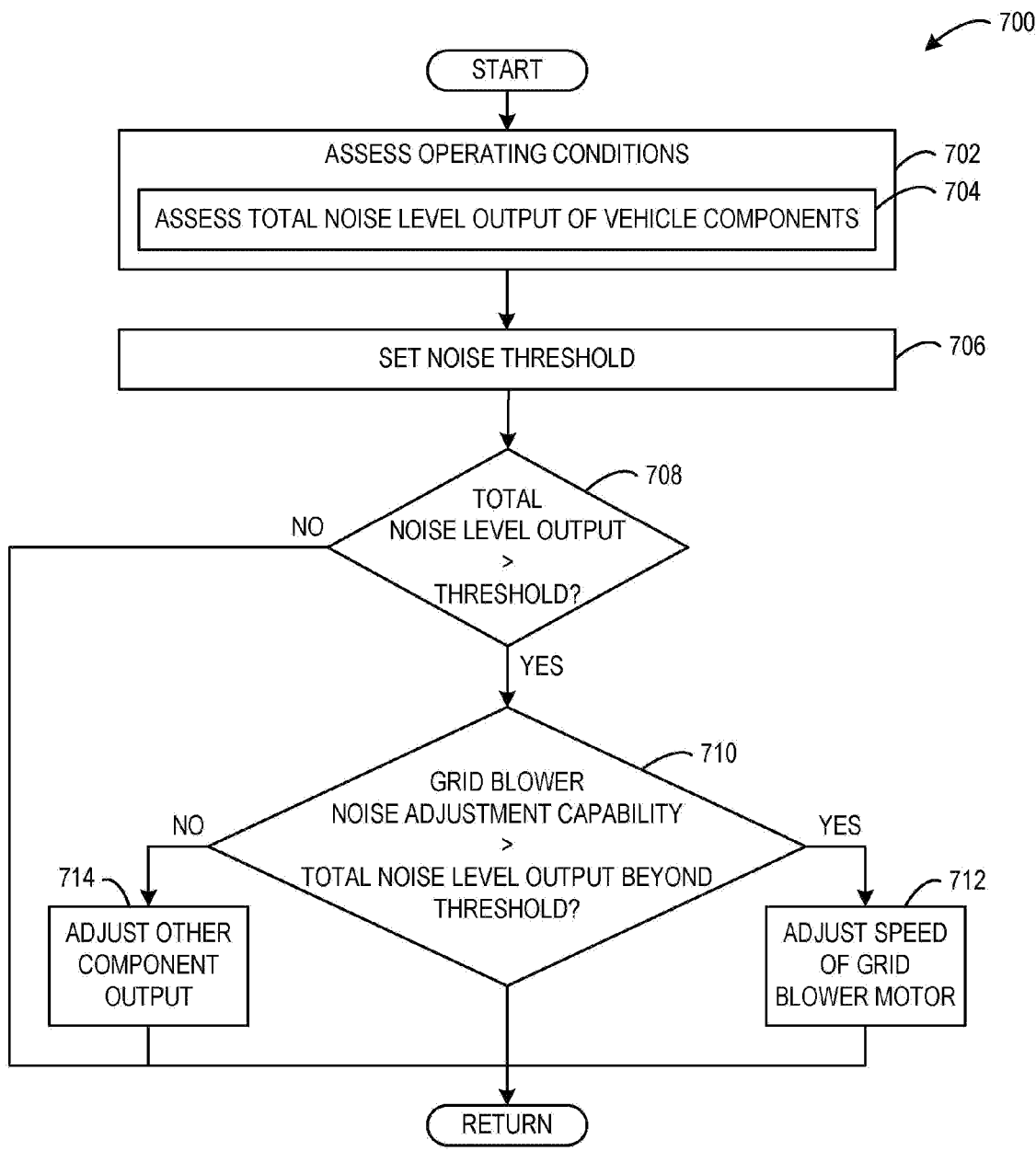
FIG. 7 shows a flowchart of an example audible noise level control method.

The grid blower may be operated at as high of a speed as possible to generate maximum cooling of the grid. However, under some conditions, it may be desirable to operate the grid blower motor at a different speed. For example, the grid blower motor speed may be adjusted based on an audible noise level generated as a result of noise, vibration, harshness produced by the grid blower. In one particular example, a vehicle may be required to operate below an audible noise threshold level while traveling through different areas, such as a residential area or a mountain pass. To meet the audible noise threshold various components of the vehicle, including the grid blower, may be adjusted to reduce the audible sound level. FIG. 7 shows a flowchart of an example method for controlling audible noise output of a vehicle based on the audible noise output capability of a grid blower. A flowchart 700 begins at 702, where the method may include assessing operating conditions of the vehicle system. Non-limiting examples of operating conditions that may be assessed include vehicle travel speed, engine speed, motor speed, ambient temperatures, component temperatures, air density, etc.

At 704, the method may include assessing the total audible noise level output of components of the locomotive based on the assessed operating conditions. In one example, an audible noise level for each component of the locomotive may be determined based on one or more given operating parameters of the component. In particular, the audible noise level of each component may be mapped to the one or more operating parameters in a look-up table stored in memory. Thus, a noise level for each component may be determined from the look-up table to assess the total audible noise level of the blower and/or any vehicle supporting the blower.

At 706, the method may include setting an audible noise threshold. The audible noise threshold may indicate a level of audible noise that should not be exceeded by the total audible noise level generated by the operation of the locomotive. In some embodiments, the audible noise threshold may be set based on a location of the locomotive. For example, the threshold may be set to a high audible noise level when the locomotive is traveling through rural areas and the threshold may be set to a low audible noise level when the locomotive is traveling through urban areas. In one example, the threshold level based on location may be set manually. In another example, the location may be inferred based on the speed of the locomotive and the threshold may be set based on the speed. In one example, the audible noise threshold may be based on global positions system coordinate information or based on another signal received by the locomotive, such as from extended radio frequency signals sent from sensors proximate to the railroad track. For example, a sensor at a railroad crossing or a bridge may send a signal to the locomotive. In yet another example, the threshold may be based on a configuration of the locomotive. For example, the threshold may be set based on the number of grid blowers and/or other equipment currently operating.

At 708, the method may include comparing the total audible noise level of the locomotive with the threshold audible noise level. If it is determined that the total audible noise level of the locomotive exceeds the threshold audible noise level, the flowchart moves to 710. Otherwise, the flowchart ends.

At 710, if the total audible noise level exceeds the threshold audible noise level the noise level should be reduced. Therefore, the method may compare the grid blower audible noise level adjustment capability to the audible noise level that exceeds the threshold audible noise level. The comparison determines if a change in grid blower operation is capable of lowering the total audible noise level below the threshold audible noise level. If the grid blower audible noise level adjustment capability is greater than the audible noise level that exceeds the threshold audible noise level the flowchart moves to 712. Otherwise, the grid blower audible noise level adjustment capability is less than the audible noise level that exceeds the threshold audible noise level and the flowchart moves to 714.

At 712, the method may include adjusting the speed of the grid blower motor to reduce the audible noise level of the grid blower so that the total audible noise level of the locative may be reduced to below the threshold audible noise level.

At 714, the grid blower audible noise level adjustment capability is less than the audible noise level that exceeds the threshold audible noise level, so the method may include adjusting the operation of a locomotive component other than the grid blower to reduce the total audible noise level of the locomotive to below the threshold audible noise level. For example, the output of the engine and/or the traction motor may be adjusted to reduce the audible noise level of the locomotive to below the threshold audible noise level.

Because the speed of the grid blower does not depend on the electrical power on the grid, the grid blower may be adjusted to achieve various operating objectives. In particular, under some conditions, the speed of grid blower may be adjusted to a high speed to provide enhanced forced-air cooling that would not be achieved as quickly if the operation of the grid blower was dependent on the electrical power on the grid. Moreover, under some conditions, the speed of the grid blower may be adjusted to reduce a level of audible noise to meet a desired audible noise level.

Figure 8:
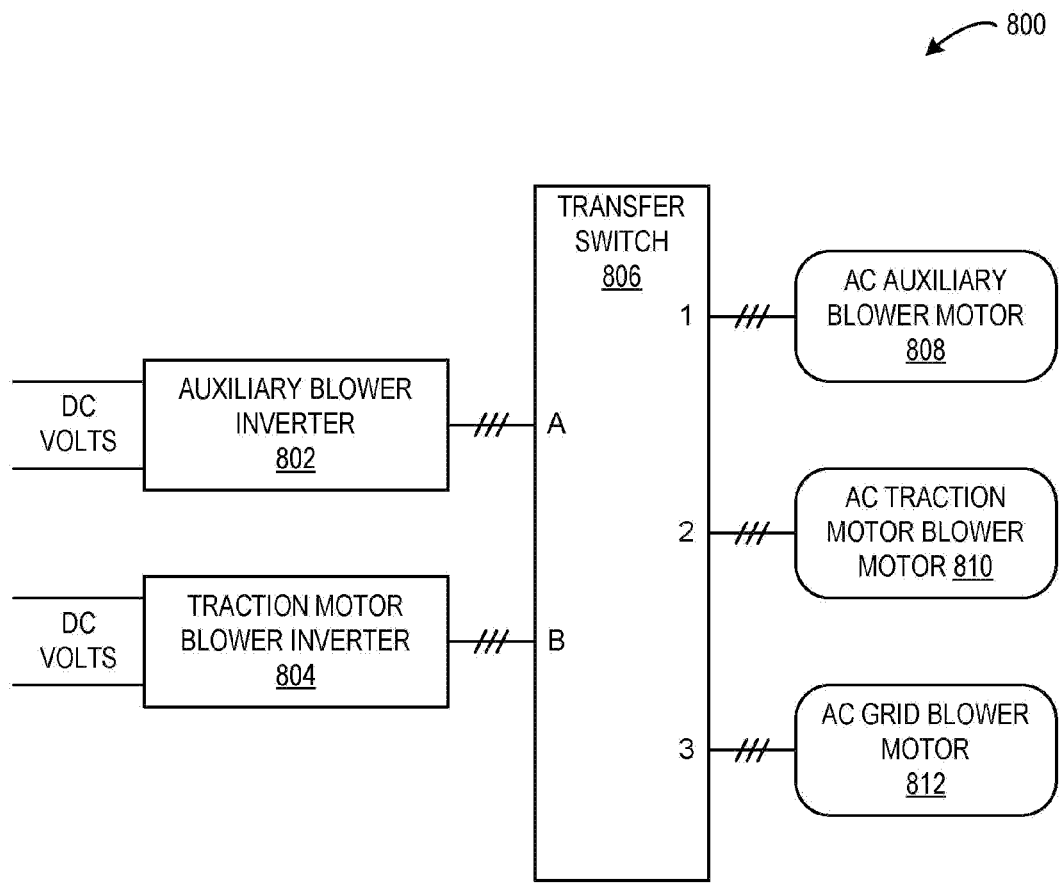
FIG. 8 shows a schematic diagram of an embodiment of an inverter-motor coupling configuration.

FIG. 8 schematically shows an example of an inverter-motor drive coupling configuration. The inverter-motor coupling configuration utilizes a transfer switch to enable two different inverters to each selectively provide electrical power to one of three different motors of the vehicle system based on operating conditions. The inverter-motor coupling configuration 800 includes an auxiliary blower inverter 802 and a traction motor blower inverter 804 coupled to respective inputs of a transfer switch 806. Both of the auxiliary blower inverter and the traction motor blower inverter 804 may receive DC voltage from a DC power source, such as a DC bus. Further, both of the auxiliary blower inverter and the traction motor blower inverter 804 may invert the DC voltage to AC voltage, and in some cases, may vary the frequency and/or the voltage to a suitable form for one of the motors.

An AC auxiliary blower motor 808, an AC traction motor blower motor 810, and an AC grid blower motor 812 may be coupled to respective outputs of the transfer switch. The AC auxiliary blower motor may provide electrical power to an auxiliary blower to provide forced-air cooling. Forced-air cooling may be provided by the auxiliary blower to cool an auxiliary component of the vehicle system. For example, the auxiliary component may include a radiator blower to cool a radiator of the vehicle system. As another example, the auxiliary component may include an intake air cooler to cool intake air being drawn in for compression by a compression device. The AC traction motor blower motor may provide electrical power to a traction motor blower to provide forced-air cooling to the traction motor. The AC grid blower motor 812 may provide electrical power to a grid blower to provide forced-air cooling to the grid.

The traction motor blower inverter may be designated for primarily providing electrical power to the traction motor blower motor, and under some conditions, may provide electrical power to one of the other motors connected to the transfer switch 806. Similarly, the auxiliary blower inverter may be designated for primarily providing electrical power to the auxiliary blower motor of an auxiliary component of the vehicle system, and under some conditions, may provide electrical power to one of the other motors connected to the transfer switch.

The above described configuration may be modified to include additional blower motors and/or inverters selectively connected via one or more switches without departing from the scope of the present disclosure. In some embodiments, one or more AC blower motors may be replaced by a DC motor connected to a chopper or speed control circuit.

Figure 9:
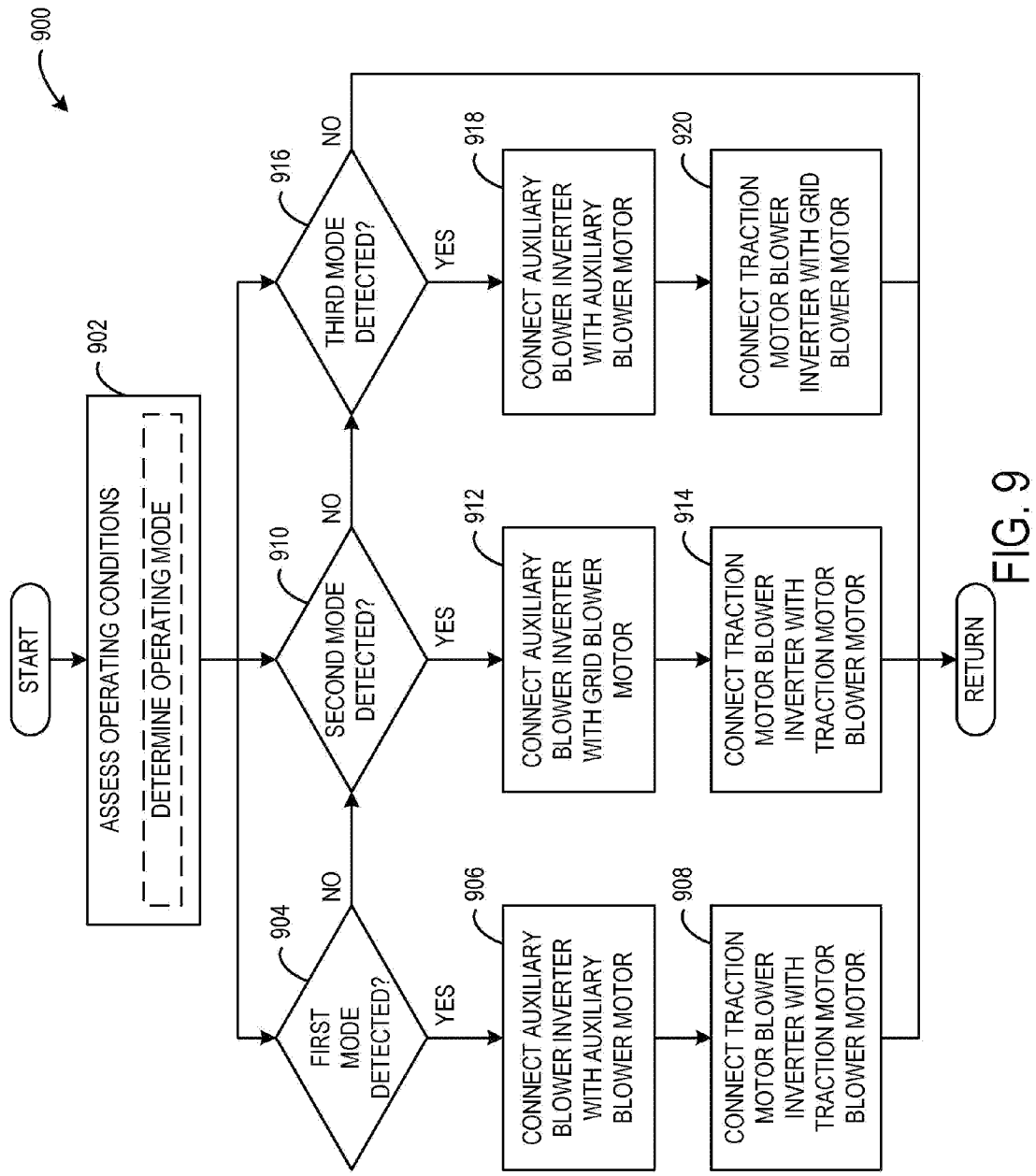
FIG. 9 shows a flowchart of an example electrical power distribution method utilizing the inverter-motor coupling configuration of FIG. 8.

FIG. 9 shows a flowchart of an example method for distributing electrical power by controlling the transfer switch of FIG. 8 based on operating conditions of the vehicle system. More particularly, the electrical power may be selectively distributed from the inverters to the motors based on an operating mode of the vehicle system. A flowchart 900 begins at 902, where the method may include assessing operating conditions. Assessing the operating conditions may include receiving signals from sensors and calculating various operating parameters based on the signals from the sensors. The operating parameters may include, but are not limited to, engine load, traction motor load, heat dissipation grid load, etc. Further, assessing the operating parameters may be performed in view of the current system configuration. The system configurations may include the engine transferring electrical power to the traction motors, the engine transferring at least a portion of electrical power to the grids, the traction motors supplying at least a portion of electrical power to the grids. The assessed operating conditions may be used to detect a mode of operation of the vehicle system.

At 904, the method may include detecting if the vehicle system is operating in a first mode, such as a motoring mode. The motoring mode may include operation of the engine to generate electrical power for the traction motor so that the traction motor may generate torque output to propel the vehicle system. If the motoring mode is detected, the flowchart moves to 906. Otherwise, the motoring mode is not detected and the flow chart moves to 910.

At 906, the method may include connecting the auxiliary blower inverter with the auxiliary blower motor. The operation of the auxiliary blower may correspond to engine operation, in some examples. In one example, during the motoring mode, the auxiliary blower may be used for forced air-cooling of an auxiliary component such as the radiator which may used to dissipate engine heat during engine operation. In another example, during motoring mode, the auxiliary blower may be used for cooling of intake air to improve combustion efficiency of the engine.

At 908, the method may include connecting the traction motor blower inverter with the traction motor blower motor. During the motoring mode, because the traction motor is operational, the traction motor blower may be provided with electrical power to provide forced-air cooling to the traction motor. During the motoring mode, because the engine and traction motors are operational and little or no electrical power is provided to the grid, operation of the blowers associated with the engine and traction motor may be prioritized over the grid blower.

At 910, the method may include detecting if the vehicle system is operating in a second mode, such as a dynamic braking mode. The dynamic braking mode may include operation of the traction motors to generate torque output to slow the vehicle system. The torque output may generate electrical power that may be provided to the grid. If the dynamic braking mode is detected, the flowchart moves to 912. Otherwise, the dynamic braking mode is not detected and the flow chart moves to 916.

At 912, the method may include connecting the auxiliary blower inverter with the grid blower motor. During the dynamic braking mode, the temperature of the grid may increase as a result electrical power produced by the traction motors flowing across the resistors of the grid. Accordingly, the grid blower may be provided with electrical power to provide forced-air cooling to the grid.

At 914, the method may include connecting the traction motor blower inverter with the traction motor blower motor. Because the traction motor is operational during the dynamic braking mode, the traction motor blower may be provided with electrical power to provide forced-air cooling to the traction motor. During the dynamic braking mode, because the traction motor is operational and electrical power is provided to the grid, operation of the blowers associated with the traction motor and the grid may be prioritized over the auxiliary blower.

At 916, the method may include detecting if the vehicle system is operating in third mode, such as a self loading mode. The self loading mode may include operation of the engine to generate electrical power to load the vehicle system for diagnostic purposes, for example. During the self loading mode, electrical power generated as a result of engine operation may be provided to the grid and little or no electrical power may be provided to the traction motors. If the self loading mode is detected, the flowchart moves to 918. Otherwise, the self loading is not detected and the flow chart ends.

Alternatively, the third mode may be another operating mode where at least some electrical power is supplied to grid blower via the inverters and substantially no electrical power is supplied to the grid. The third operating mode may be performed for purposes of de-icing the grid at cold climates as well as to move bearings of the grid blower for anti-bernelling purposes so lubrication film on the bearings remains effective. In one example, the grid blower may be operated based on lubrication hardness level such that the grid blower may be operated to move bearing of the grid blower to prevent the lubrication of the bearings from reaching a predetermined level of hardness.

Additionally, this third mode of operation may be performed after a braking operation, wherein elements of the grid have increased in temperature and the grid blower may be operated to cool the elements even though no electrical power is being dissipated in the grids. Without sufficient airflow, the insulation devices may heat up to a higher temperature than during powered operation and then cool down to ambient. Because these types of materials may degrade at higher temperatures, transient higher temperatures may cause a higher failure rate. In this third mode of operation, because the air flow is maintained, this does not happen and the temperature does not increase and the failure mode is reduced or eliminated.

At 918, the method may include connecting the auxiliary blower inverter with the auxiliary blower motor. Because the auxiliary blower may be related to engine operation and the engine may be operational during third mode, the auxiliary blower may be provided with electrical power to provide forced-air cooling.

At 920, the method may include connecting the traction motor blower inverter with the grid blower motor. During the third mode, because the grid or the electrical power bus is receiving electrical power, the grid blower may be provided with electrical power to operate to grid blower to provide forced-air cooling, de-icing, anti-bernelling, etc. During the third mode, because the engine may be operational and electrical power may be provided to the grid, operation of the blowers associated with the engine and the grid may be prioritized over the traction motor blower.

In some embodiments, during the different operating modes, the grid blower motor may operate temporarily in a reverse direction for intake cleaning purposes such as when an intake of the grid blower is blocked by debris. Because the blower motors may be connected to the inverters, electrical power may be applied to the grid without operation of the blower motors. For example, the grid may be powered without the blower running during light loads conditions, during low audible noise output conditions, or for preventing moisture/ice formation on the grid.

The connection of an inverter with a motor as described in the above method may be achieved through control of state the transfer switch, such as by a controller of the vehicle system. By connecting the inverters and motors to a transfer switch and controlling the state of the transfer switch based on the mode of operation of the vehicle system, distribution of electrical power may be prioritized to components that are operational during the particular operating mode. Accordingly, the amount of inverters for use with the motors may be reduced and vehicle system production costs may be reduced.

In some embodiments, one or more AC blower motors and their inverters may be replaced with a DC motor connected via a chopper or speed control circuit. Further, the transfer switch may be controlled to selectively connect the DC motors with the chopper circuit based on operating mode.

Note that the example control and estimation routines and/or methods included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required. One or more of the illustrated actions, functions, or operations may be repeatedly performed depending on the particular strategy being used. Further, the described operations, functions, and/or acts may graphically represent code to be programmed into computer readable storage medium in the control system.

In an embodiment, a system comprises a grid coupled to an electrical bus, an electrical power modulation device coupled to the electrical bus and configured to output modified electrical power received from the electrical bus, and a blower motor coupled to the electrical power modulation device and configured to receive the modified electrical power output and to provide a stream of air to affect a temperature of the grid. A speed of the blower motor is based at least in part on an amount of the modified electrical power. The system further comprises a controller operable to receive an operating parameter, and configured to cause the electrical power modulation device to vary the amount of the modified electrical power and thereby to control a speed of the blower motor based at least in part on the operating parameter.

In an embodiment, a system comprises a grid coupled to an electrical bus, an electrical power modulation device coupled to the electrical bus and configured to output modified electrical power received from the electrical bus, and a blower motor coupled to the electrical power modulation device and configured to receive the modified electrical power output and to provide a stream of air to affect a temperature of the grid. A speed of the blower motor is based at least in part on an amount of the modified electrical power. The system further comprises a controller operable to receive an operating parameter, and configured to cause the electrical power modulation device to vary the amount of the modified electrical power and thereby to control a speed of the blower motor based at least in part on the operating parameter. The grid comprises one or more resistive elements, and the blower motor is coupled to a fan that, during operation, cools the resistive elements.

In an embodiment, a system comprises a grid coupled to an electrical bus, an electrical power modulation device coupled to the electrical bus and configured to output modified electrical power received from the electrical bus, and a blower motor coupled to the electrical power modulation device and configured to receive the modified electrical power output and to provide a stream of air to affect a temperature of the grid. A speed of the blower motor is based at least in part on an amount of the modified electrical power. The system further comprises a controller operable to receive an operating parameter, and configured to cause the electrical power modulation device to vary the amount of the modified electrical power and thereby to control a speed of the blower motor based at least in part on the operating parameter. The grid comprises an energy storage device.

In an embodiment, a system comprises a grid coupled to an electrical bus, an electrical power modulation device coupled to the electrical bus and configured to output modified electrical power received from the electrical bus, and a blower motor coupled to the electrical power modulation device and configured to receive the modified electrical power output and to provide a stream of air to affect a temperature of the grid. A speed of the blower motor is based at least in part on an amount of the modified electrical power. The system further comprises a controller operable to receive an operating parameter, and configured to cause the electrical power modulation device to vary the amount of the modified electrical power and thereby to control a speed of the blower motor based at least in part on the operating parameter. The controller is further configured to operate the blower motor with a cycle skipping firing pattern. In an embodiment, for example, the blower motor is operated at ¼ or ½ speed. In another embodiment, as another example, the blower motor is supplied with sufficient current to provide a relatively constant temperature of up to about 15 degrees Celsius warmer than the blower motor would be without any supplied current. In another embodiment, as another example, the blower motor is supplied with sufficient current to operate the blower motor but insufficient current to heat the blower motor to more than about 15 degrees Celsius warmer than the blower motor would be without any supplied current.

In an embodiment, a system comprises a grid coupled to an electrical bus, an electrical power modulation device coupled to the electrical bus and configured to output modified electrical power received from the electrical bus, and a blower motor coupled to the electrical power modulation device and configured to receive the modified electrical power output and to provide a stream of air to affect a temperature of the grid. A speed of the blower motor is based at least in part on an amount of the modified electrical power. The system further comprises a controller operable to receive an operating parameter, and configured to cause the electrical power modulation device to vary the amount of the modified electrical power and thereby to control a speed of the blower motor based at least in part on the operating parameter. The operating parameter includes one or both of ambient temperature and ambient humidity level.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition. The method further comprises storing the amount of electrical power across an electrical bus in a grid, wherein the operating condition is a temperature of the grid, and supplying a stream of air from the blower to the grid and thereby to cool the grid.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition. The supplied modulated electrical power is controllable independent of the amount of electrical power across the electrical bus.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition. The operating condition includes sensed vibrations above a threshold vibration level.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition. The step of modulating may comprise a cycle skipping operation, and further comprising operating the motor for a period of time at a speed that is less than a full speed of the motor.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition. The operating condition comprises an ambient temperature, an ambient humidity level, or both.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition. The operating condition comprises an ambient temperature, an ambient humidity level, or both. The ambient temperature and the ambient humidity level are sufficient to allow or facilitate formation of ice, if the motor is not operating, on or proximate to the blower, the motor, or both the blower and the motor.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition. The operating condition comprises an ambient temperature, an ambient humidity level, or both. The ambient temperature and the ambient humidity level are sufficient to allow or facilitate formation of ice, if the motor is not operating, on or proximate to the blower, the motor, or both the blower and the motor. The blower is configured to supply a stream of air from the blower to a grid and thereby to cool the grid, and further comprising operating the blower by supplying a sufficient amount of modulated electrical power to increase a temperature of the motor to reduce or prevent the formation of ice: when a temperature of the grid is about the same as an ambient temperature, and at a speed that is less than a full speed of the motor. In another embodiment, alternatively or additionally, operating the blower comprises running the motor at a speed that is in a range of from about 1 percent to about 10 percent of the full operating speed of the motor.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition. The operating condition comprises an ambient temperature, an ambient humidity level, or both. The ambient temperature and the ambient humidity level are sufficient to allow or facilitate formation of ice, if the motor is not operating, on or proximate to the blower, the motor, or both the blower and the motor. Supplying the modulated electrical power comprises supplying the motor with sufficient current to provide a relatively constant temperature of up to about 15 degrees Celsius warmer than the blower motor would be without any supplied current.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition. The operating condition comprises an ambient temperature, an ambient humidity level, or both. The ambient temperature and the ambient humidity level are sufficient to allow or facilitate formation of ice, if the motor is not operating, on or proximate to the blower, the motor, or both the blower and the motor. Supplying the modulated electrical power comprises operating the motor with a cycle skipping firing pattern.

In another embodiment, a method comprises generating an amount of electrical power across an electrical bus, modulating at least some of the amount of electrical power, and supplying modulated electrical power to a motor of a blower to control at least one of a speed and a direction of the motor based at least in part on an operating condition. Modulating at least some of the amount of electrical power includes adjusting at least one of a voltage level and a frequency.

In another embodiment, a system (e.g., a blower motor switchable drive system for a rail vehicle or other vehicle) comprises a transfer switch, a first inverter coupled to a first input of the transfer switch, a second inverter coupled to a second input of the transfer switch, a first alternating current blower motor for powering an auxiliary component blower (the first alternating current blower motor coupled to a first output of the transfer switch), a second alternating current blower motor for powering a traction motor blower (the second alternating current blower motor coupled to a second output of the transfer switch), a third alternating current blower motor for powering a grid blower (the third alternating current blower motor coupled to a third output of the transfer switch), and a controller. The controller is configured to cause the transfer switch to connect the first inverter with the first alternating current blower motor and connect the second inverter with the second alternating current blower motor at a first mode of operation, to connect the first inverter with the first alternating current blower motor and connect the second inverter with the third alternating current blower motor at a second mode of operation, and to connect the first inverter with the third alternating current blower motor and connect the second inverter with the second alternating current blower motor at a third mode of operation.

This written description uses examples to disclose the invention, including the best mode, and also to enable a person of ordinary skill in the art to practice the invention, including making and using any devices or systems and performing any incorporated methods. The patentable scope of the invention is defined by the claims, and may include other examples that may occur. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
 a transfer switch;
 a first inverter coupled to a first input of the transfer switch;
 a second inverter coupled to a second input of the transfer switch;
 a first alternating current blower motor for powering an auxiliary component blower, the first alternating current blower motor coupled to a first output of the transfer switch;
 a second alternating current blower motor for powering a traction motor blower, the second alternating current blower motor coupled to a second output of the transfer switch;
 a third alternating current blower motor for powering a grid blower, the third alternating current blower motor coupled to a third output of the transfer switch; and a controller, the controller configured to cause the transfer switch to connect the first inverter with the first alternating current blower motor and connect the second inverter with the second alternating current blower motor at a first mode of operation, to connect the first inverter with the first alternating current blower motor and connect the second inverter with the third alternating current blower motor at a second mode of operation, and to connect the first inverter with the third alternating current blower motor and connect the second inverter with the second alternating current blower motor at a third mode of operation.

2. The system of claim 1, further comprising:
a DC bus,
wherein the first inverter and the second inverter are configured to receive DC power from the DC bus and to convert the DC power into AC power.

3. The system of claim 2, further comprising:
an intake air cooler configured to cool intake air being drawn in for compression by a compression device; and
the auxiliary component blower, wherein the auxiliary component blower is configured to provide forced-air cooling to the intake air cooler.

4. The system of claim 2, further comprising:
a radiator; and
the auxiliary component blower, wherein the auxiliary component blower comprises a radiator blower configured to cool the radiator.

5. The system of claim 2, further comprising:
a traction motor; and
the traction motor blower, wherein the traction motor blower is configured to provide forced-air cooling to the traction motor.

6. The system of claim 2, further comprising:
a grid having plural resistive elements for dissipating electrical power during a dynamic braking operation; and
the grid blower, wherein the grid blower is configured to provide forced-air cooling to the grid.

7. The system of claim 2, further comprising:
a traction motor;
the traction motor blower, wherein the traction motor blower is configured to provide forced-air cooling to the traction motor;
a grid having plural resistive elements for dissipating electrical power during a dynamic braking operation of the traction motor; and
the grid blower, wherein the grid blower is configured to provide forced-air cooling to the grid.

8. The system of claim 1, further comprising:
an intake air cooler configured to cool intake air being drawn in for compression by a compression device; and
the auxiliary component blower, wherein the auxiliary component blower is configured to provide forced-air cooling to the intake air cooler.

9. The system of claim 1, further comprising:
a radiator; and
the auxiliary component blower, wherein the auxiliary component blower comprises a radiator blower configured to cool the radiator.

10. The system of claim 1, further comprising:
a traction motor; and
the traction motor blower, wherein the traction motor blower is configured to provide forced-air cooling to the traction motor.

11. The system of claim 1, further comprising:
a grid having plural resistive elements for dissipating electrical power during a dynamic braking operation; and
the grid blower, wherein the grid blower is configured to provide forced-air cooling to the grid.

12. The system of claim 1, further comprising:
a traction motor;
the traction motor blower, wherein the traction motor blower is configured to provide forced-air cooling to the traction motor;
a grid having plural resistive elements for dissipating electrical power during a dynamic braking operation of the traction motor; and
the grid blower, wherein the grid blower is configured to provide forced-air cooling to the grid.

13. A vehicle comprising:
a traction motor;
a transfer switch;
a first inverter coupled to a first input of the transfer switch;
a second inverter coupled to a second input of the transfer switch;
an auxiliary component blower;
a first alternating current blower motor configured to power the auxiliary component blower, the first alternating current blower motor coupled to a first output of the transfer switch;
a traction motor blower configured to cool the traction motor;
a second alternating current blower motor configured to power the traction motor blower, the second alternating current blower motor coupled to a second output of the transfer switch;
a grid having plural resistive elements for dissipating electrical power during a dynamic braking operation of the traction motor;
a grid blower, wherein the grid blower is configured to cool the grid;
a third alternating current blower motor configured to power the grid blower, the third alternating current blower motor coupled to a third output of the transfer switch; and
a controller, the controller configured to cause the transfer switch to connect the first inverter with the first alternating current blower motor and connect the second inverter with the second alternating current blower motor at a first mode of operation, to connect the first inverter with the first alternating current blower motor and connect the second inverter with the third alternating current blower motor at a second mode of operation, and to connect the first inverter with the third alternating current blower motor and connect the second inverter with the second alternating current blower motor at a third mode of operation.

14. A method comprising:
with a controller having a processor, detecting a mode of operation of a vehicle system;
responsive to detecting that the mode of operation is a motoring mode of operation of the vehicle system, with the controller, controlling a transfer switch to connect an auxiliary blower inverter with an auxiliary blower motor of the vehicle system and to connect a traction motor blower inverter with a traction motor blower motor of the vehicle system;
responsive to detecting that the mode of operation is a dynamic braking mode of operation of the vehicle system, with the controller, controlling the transfer switch to connect the auxiliary blower inverter with a grid blower motor of the vehicle system and to connect the traction motor blower inverter with the traction motor blower motor; and responsive to detecting that the mode of operation is a third mode of operation of the vehicle system, with the controller, controlling the transfer switch to connect the auxiliary blower inverter with the auxiliary blower motor and to connect the traction motor blower inverter with the grid blower motor.

15. The method of claim 14, wherein detecting the mode of operation of the vehicle system comprises receiving signals from sensors on board the vehicle system, calculating one or more operating parameters of the vehicle system based on the signals from the sensors, and assessing the operating parameters.

* * * * *